Nov. 8, 1960     E. W. LEATHERMAN ET AL     2,959,785
PRESSURIZING SYSTEMS FOR DUAL WALL FABRIC RADOMES
Filed April 17, 1958     4 Sheets-Sheet 1
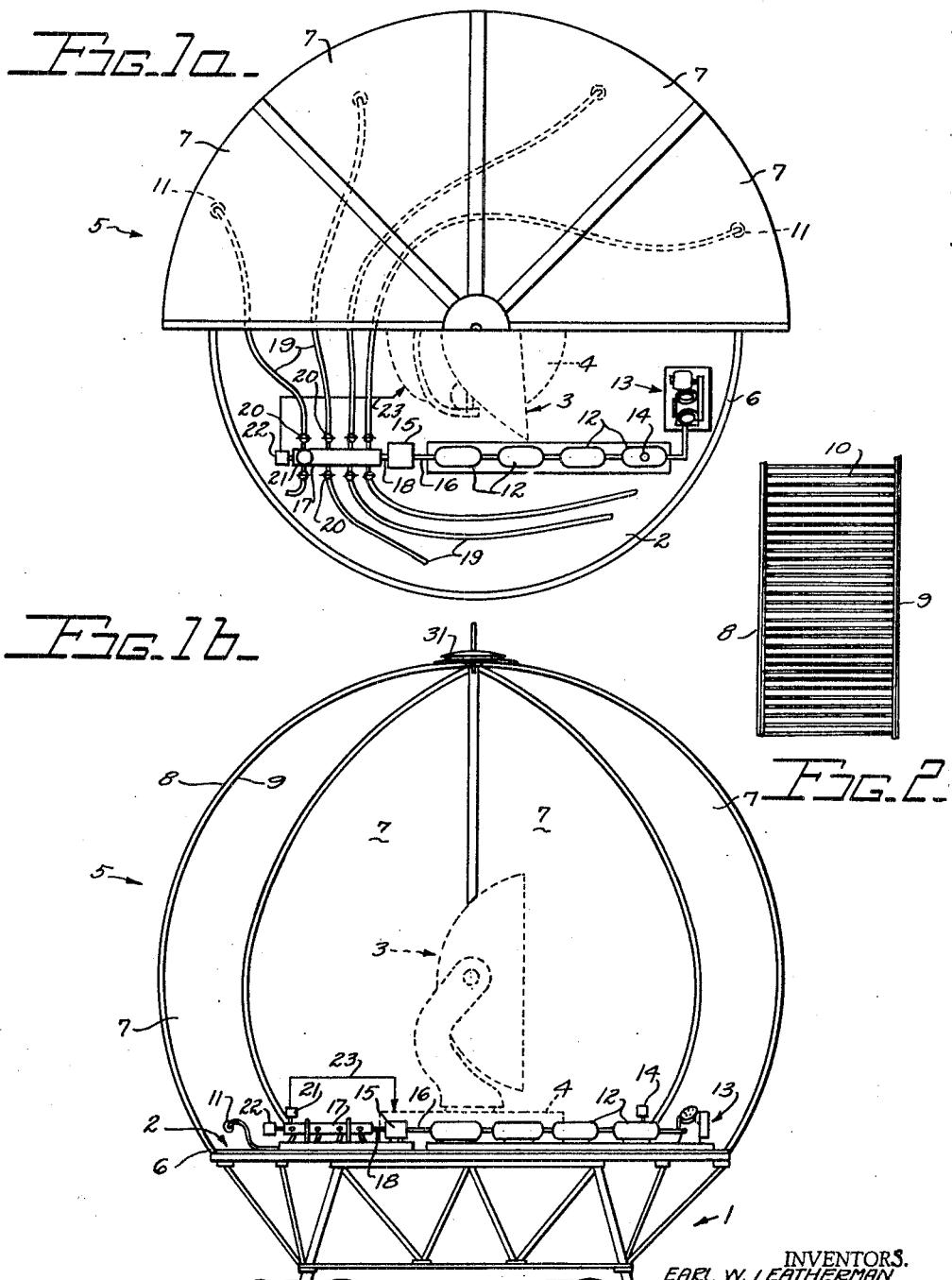
INVENTORS.
EARL W. LEATHERMAN
WILLIAM C. JOHNSON, JR.
ROBERT S. ROSS
BY
ATTORNEY
AGENT

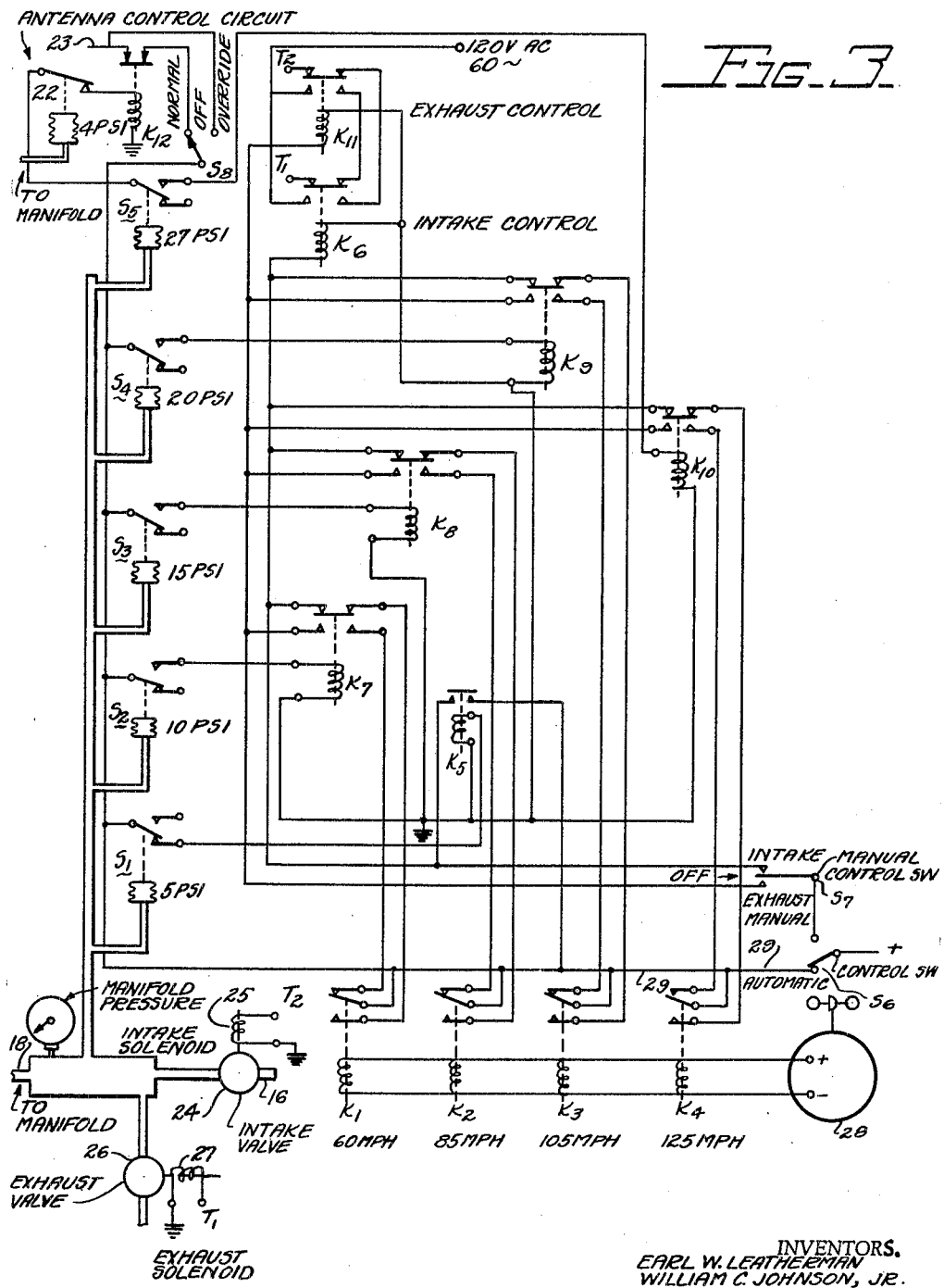

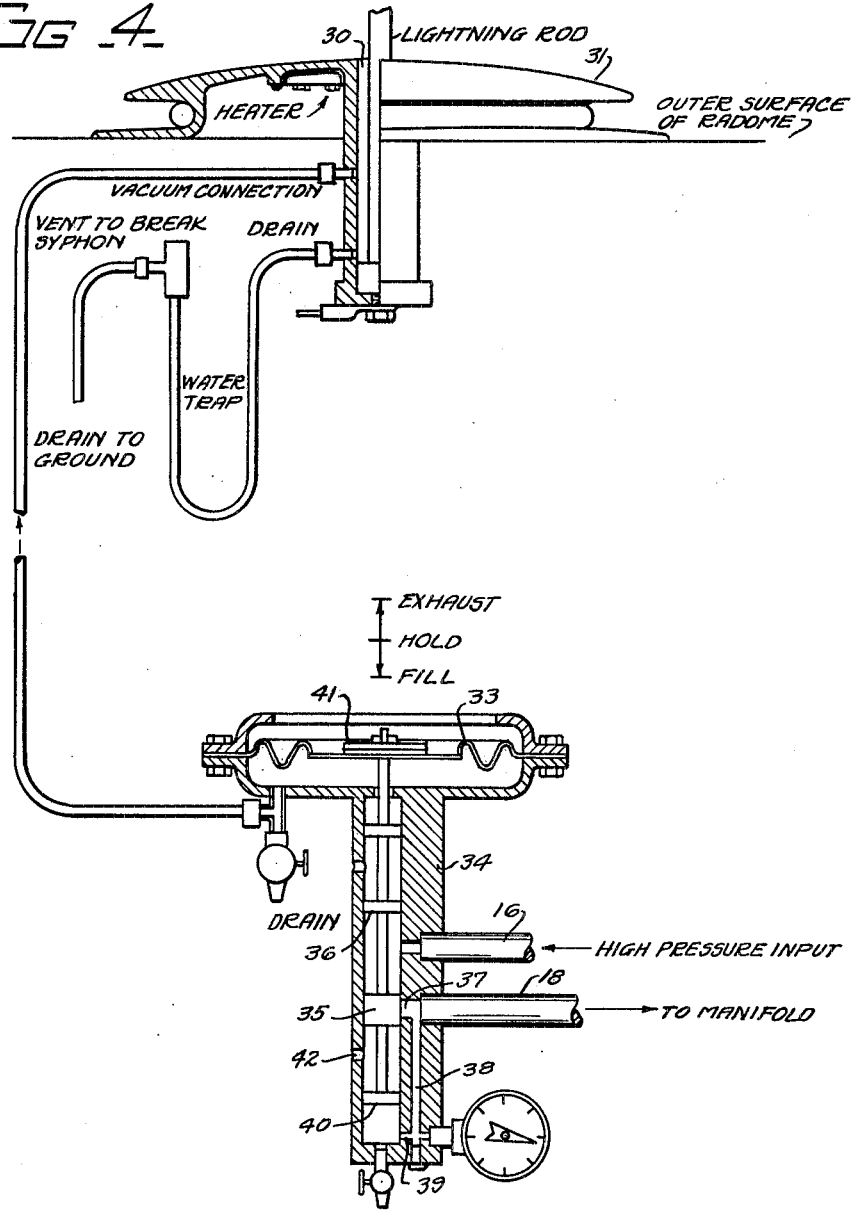

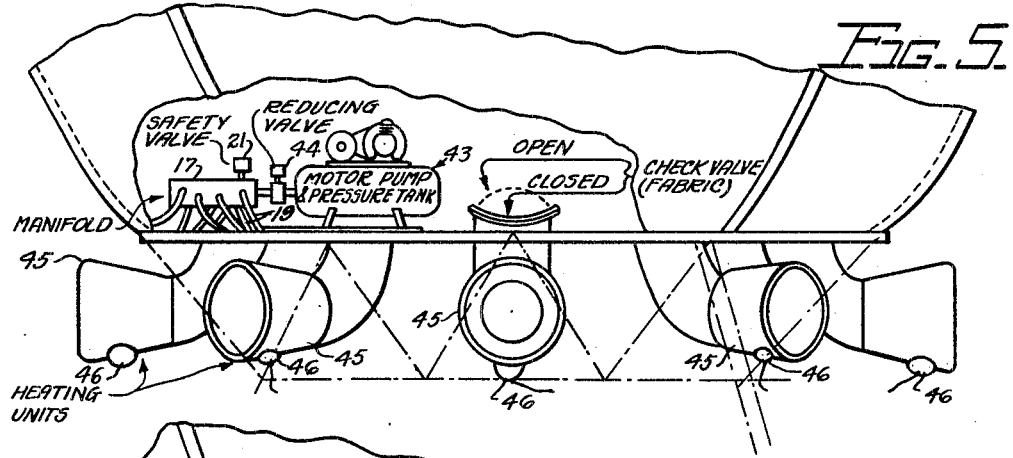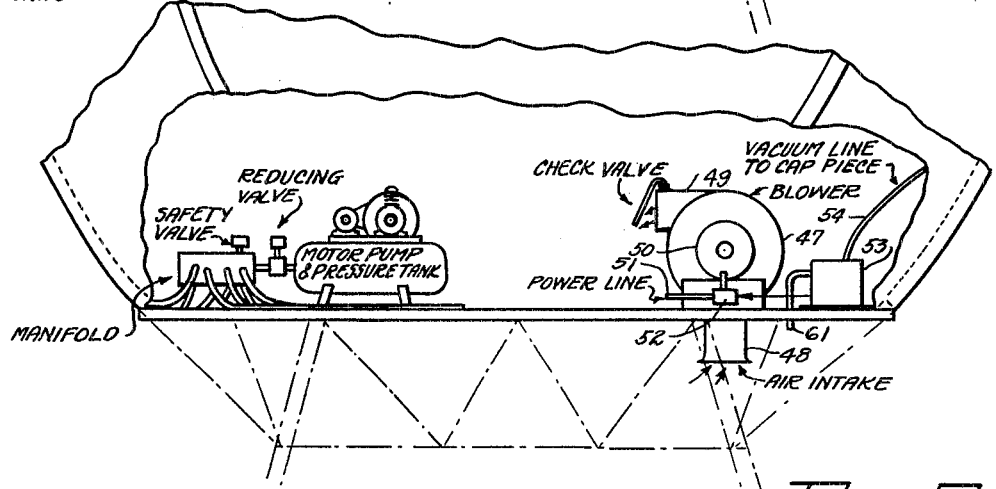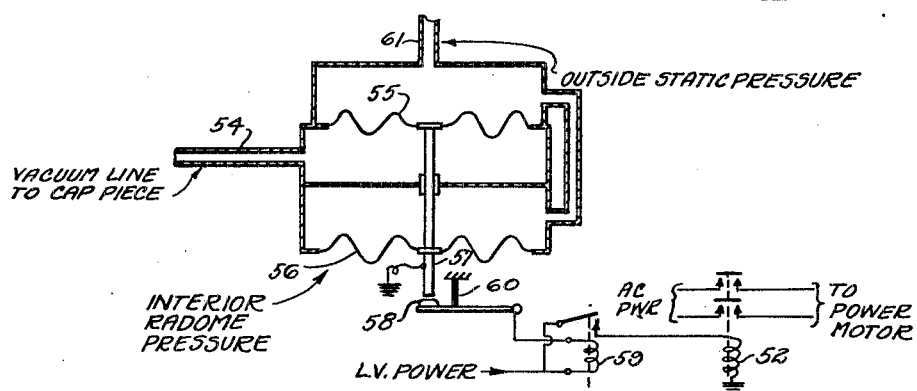

United States Patent Office 2,959,785
Patented Nov. 8, 1960

2,959,785

PRESSURIZING SYSTEMS FOR DUAL WALL FABRIC RADOMES

Earl W. Leatherman, Akron, William C. Johnson, Jr., Hiram, and Robert S. Ross, Cleveland, Ohio, assignors, by mesne assignments, to the United States of America as represented by the Secretary of the Air Force Filed Apr. 17, 1958, Ser. No. 729,220

7 Claims. (Cl. 343—872)

This invention relates to dual wall fabric radomes and particularly to automatic pressurizing systems for maintaining their structural rigidity under varying wind conditions. Dual wall radomes normally consist of a plurality of air-tight sections or cells joined together and attached to a base to form a complete antenna enclosure. The cells are inflated to several pounds above atmospheric pressure to provide sufficient rigidity for the structure to be self supporting. It is customary to use the lowest pressure possible in order to prevent unnecessary strain on the dual wall fabric; however, this low pressure may be insufficient to maintain the structural stiffness needed to prevent local or general collapse of the radome envelope in high winds. In accordance with the invention, automatic means are provided for maintaining the required minimum pressure in the cells at all times and in addition acting in the presence of wind to increase either the cell pressure or the interior radome pressure in proportion to the wind intensity to provide the structural stiffness necessary to withstand the wind load.

A detailed description of the systems provided for accomplishing the above results will be given in connection with the specific embodiments thereof shown in the accompanying drawings in which Figs. 1a and 1b are plan and elevation views of a dual wall fabric radome, with half of the radome envelope removed, containing apparatus for regulating cell pressures, Fig. 2 illustrates the construction of the dual wall fabric, Fig. 3 is a schematic wiring diagram of an electrical means for effecting the required automatic cell pressure regulation as a function of wind velocity, Fig. 4 illustrates a pneumatic pressure regulator that may be substituted for the regulator of Fig. 3, Fig. 5 illustrates a system for maintaining the required minimum cell pressure and, by use of the ram principle, for increasing the interior radome pressure in accordance with wind velocity, Fig. 6 resembles the system of Fig. 5 with the difference that a blower, automatically controlled by wind velocity, is used to supply the required interior radome pressure, Fig. 7 illustrates a possible pneumatic control for the blower of Fig. 6.

Referring to Figs. 1a and 1b a typical antenna installation consists of a steel tower 1 supporting a circular platform 2 which in turn supports an antenna 3 placed at its center. The antenna 3 rests on a base 4 which may be considered to contain all the apparatus necessary to produce the rotational and nodding movements of the antenna necessary to effect the desired scanning pattern. The antenna is covered and protected by a radome 5 in the form of a sphere cut off to fit the platform 2 to which it is attached at a flange 6. For illustrative purposes, only half of the radome is shown in the drawing.

The radome consists of eight identical air-tight sections 7. These are joined together to form a complete spherical housing for the antenna. The air-tight sections or cells 7 are made of a special dual wall fabric, an enlarged section of which is shown in Fig. 2. The fabric consists of two woven cloth walls 8 and 9 having a multiplicity of equal length tie threads 10 extending between and woven to the walls. The cloth and tie threads may be made of a material resistant to moisture and decay such as nylon and the cloth walls are coated on their outer surfaces by a suitable weather resistant gas impervious material such as neoprene. Fabric of the above described basic structure is a known item and is available commercially under the trade name of Airmat.

The principle of the dual wall radome is known in the art and described in the literature. For example, see Microwave Antenna Theory and Design, Silver, vol. 12, Radiation Laboratory Series, McGraw-Hill. The purpose of the dual wall construction is to reduce losses due to reflection of incident radiant energy. Briefly, this is accomplished by spacing the two walls by one quarter wavelength at the operating frequency. Under this condition, the energy reflected from the second wall undergoes a phase reversal relative to the energy reflected from the first wall so that the reflected waves cancel, leaving a net reflection of zero or very nearly so. When the above described dual wall fabric is inflated, the two walls are held at the desired quarter wavelength spacing by the tie threads.

Each of the cells 7 of the radome is individually inflatable and each is provided with an air connection 11 for this purpose. Figs. 1a and 1b show schematically apparatus for controlling the pressure within the radome cells 7. The system shown operates to maintain the air pressure in the cells at the minimum value required to support the envelope in the absence of wind and operates in response to wind to increase the cell pressures as required to withstand the wind load. When the wind intensity dies, the cell pressure is automatically reduced to avoid unnecessary stress on the dual wall fabric. Air pressure requirements within the dual wall cells vary from 5 p.s.i. in calm weather to 27 p.s.i. at a wind velocity of 125 m.p.h. About half of the air needed for maximum pressure increase in case of sudden storms is stored in the four high pressure tanks 12 at, for example, 250 p.s.i. The remaining air required is delivered by compressor 13 which is of sufficient size to refill the storage tanks in a short time. A safety valve 14 limits the tank pressure. Four tanks are used rather than a single tank because of ease of handling and erection, and also because of the dehumidifying effect of the increased tank surface. The greater surface has an increased cooling effect on the compressed air causing moisture to condense and drain to the bottoms of the tanks from which it can be removed as a maintenance function.

High pressure air from tanks 12 is applied to pressure control unit 15 through high pressure line 16. The pressure control unit in turn is connected to manifold 17 through line 18. The eight independently inflated cells 7 of the radome are also connected to manifold 17 by air lines 19 through individual shut off valves 20 so that a damaged cell may be isolated from the manifold. The maximum pressure in the manifold is limited by safety valve 21 to a safe value for the cells 7, for example, 30 p.s.i. Pressure control unit 15 always operates to prevent the manifold pressure and therefore the cell pressure from falling below 5 p.s.i., which provides sufficient rigidity to withstand the effect of winds up to 60 m.p.h. For higher wind velocities the control unit operates to increase the cell pressure correspondingly in order to provide the increased structural rigidity needed. The details of two control units capable of performing this function will be described below. A safety feature is provided in the form of a pressure actuated switch 22 subject to manifold pressure and connected in a control circuit 23 to the antenna scanning drive located in the base 4 of the antenna. It is necessary that this switch be closed for the antenna drive to be operative. The switch is set to open at some pressure slightly below the prescribed minimum cell pressure of 5 p.s.i., for example, at 4 p.s.i. Failure of the pressure control system to the extent of allowing the manifold pressure to drop to 4 p.s.i. causes the antenna drive to be deenergized in order to avoid the danger of the radome collapsing on a moving antenna.

Fig. 3 shows an electrical embodiment of the pressure control unit 15. Pressure in the manifold is increased by admitting high pressure air from line 16 through intake valve 24 which is controlled by intake solenoid 25. Manifold pressure is reduced by exhausting air through exhaust valve 26 under the control of exhaust solenoid 27. Pressure switches $S_1$—$S_5$ are subjected to manifold pressure and are set to be actuated when the manifold pressure exceeds 5 p.s.i., 10 p.s.i., 15 p.s.i., 20 p.s.i. and 27 p.s.i., respectively. Wind velocity is sensed by D.C. anemometer generator 28 which has connected across its terminals relays $K_1$—$K_4$ designed to be actuated by voltages corresponding to wind velocities of 60 m.p.h., 85 m.p.h., 105 m.p.h. and 125 m.p.h., respectively. The operation of the circuit is as follows:

Assume the wind velocity to be below 60 m.p.h. and the manifold (cell) pressure to be below 5 p.s.i. $S_1$ is then closed, as shown, and, when line 29 is energized as by placing $S_6$ in its Automatic position, voltage is applied from line 29 through $S_1$ to relay $K_5$ closing its contacts and energizing intake control relay $K_6$. Actuation of $K_6$ energizes intake solenoid 25 opening intake valve 24 and admitting high pressure to the manifold. When the manifold pressure exceeds 5 p.s.i., $S_1$ opens deenergizing $K_5$, $K_6$ and intake solenoid 25 allowing the intake valve to close. Should the manifold pressure again fall to 5 p.s.i., $S_1$ would close reenergizing $K_5$, $K_6$ and the intake solenoid and again admitting high pressure air to the manifold. Therefore, in the absence of winds equal to or exceeding 60 m.p.h., the system operates to maintain the radome cell pressures at not less than 5 p.s.i. indefinitely.

Assuming an increasing wind velocity, when the velocity reaches 60 m.p.h. $K_1$ is actuated energizing $K_6$ through the lower contacts of $K_1$ and the upper contacts of $K_7$. Actuation of K energizes the intake solenoid and opens the intake valve causing the manifold pressure to rise. When the manifold pressure exceeds 10 p.s.i. the upper contacts of $S_2$ close energizing $K_7$ and breaking the energizing circuit of $K_6$ allowing the intake valve to close. Should the manifold pressure fall below 10 p.s.i. the upper contacts of $S_2$ would open deenergizing $K_7$ and reestablishing the energization of $K_6$ at the upper contacts of $K_7$. Therefore, with the wind velocity in the range 60–85 m.p.h., the cell pressure is automatically maintained at about 10 p.s.i.

When the wind velocity reaches 85 m.p.h. relay $K_2$ is actuated, relay $K_1$ remaining actuated. By a process identical to that described above but employing $S_3$ and $K_8$ the cell pressure is raised to 15 p.s.i. and automatically held at this value as long as the wind velocity remains in the range 85–105 m.p.h. Similarly, when the wind velocity reaches 105 m.p.h., $K_3$, $S_4$ and $K_9$ operate to raise the cell pressure to 20 p.s.i. and to hold it at this pressure as long as the wind velocity remains in the range 105–125 m.p.h. Finally, when the wind velocity reaches 125 m.p.h., $K_4$, $K_{10}$ and $S_5$ operate to raise the cell pressure to 27 p.s.i. and hold it at this pressure as long as the wind velocity is above 125 m.p.h.

The operation of the control circuit with a decreasing wind velocity will now be considered. When the velocity has decreased to a value below 125 m.p.h., $K_4$ is released applying voltage through its upper contacts and the lower contacts of $K_{10}$, held energized by $S_5$, to exhaust control relay $K_{11}$. Actuation of $K_{11}$ energizes exhaust solenoid 27 opening the exhaust valve 26 and allowing the manifold pressure to fall. However, when the pressure reaches a value less than 27 p.s.i., $S_5$ opens deenergizing $K_{10}$ which releases $K_{11}$ and deenergizes the exhaust solenoid. The exhaust valve therefore closes and prevents a further fall in cell pressure. Consequently, for a decreasing wind velocity, the cell pressure is held at or near 27 p.s.i. as long as the wind velocity lies in the range 105–125 m.p.h.

When the wind velocity falls to a value below 105 m.p.h., a process identical to that described above but involving relays $K_3$, $K_9$ and switch $S_4$ causes the cell pressure to fall to 20 p.s.i. and to remain at this value as long as the wind velocity is in the range 85–105 m.p.h. Similarly, when the wind velocity falls to a value below 85 m.p.h., $K_2$, $K_8$ and $S_3$ operate to reduce the manifold pressure to 15 p.s.i. and to hold it at this value as long as the wind velocity remains in the range 60–85 m.p.h. Finally when the wind velocity falls below 60 m.p.h., $K_1$, $K_7$ and $S_2$ operate to reduce the cell pressure to 10 p.s.i. Assuming no leakage, the pressure remains at this value as long as the wind velocity remains below 60 m.p.h. Should the wind velocity again increase to 60 m.p.h., the pressure would only rise slightly, by the amount required to close the upper contacts of $S_2$. Therefore, in the absence of leakage, the cell pressure remains at approximately 10 p.s.i. for all wind velocities below 85 m.p.h. Should the wind velocity remain below 60 m.p.h. for a long period of time, leakage may reduce the cell pressure below 10 p.s.i. but not below 5 p.s.i. due to the action of $S_1$ already explained.

It will be noted from the above that the cell pressures corresponding to the wind velocity ranges 60–85 m.p.h., 85–105 m.p.h. and 105–125 m.p.h. are higher for decreasing wind velocities than for increasing wind velocities. This characteristic provides a cushion against gusts by providing a higher pressure between gusts than would otherwise exist.

Provision is made in the form of switches $S_6$ and $S_7$ for manual control of the inflation and deflation of the radome cells. With switch $S_6$ in the Manual position, the intake and exhaust control relays $K_6$ and $K_{11}$ can be operated directly by $S_7$. A safety feature is also provided to stop or prevent antenna scanning action should the cell pressure for any reason, such as failure of the automatic pressure control, fall appreciably below the minimum 5 p.s.i. This feature includes pressure switch 22, subjected to manifold pressure, and relay $K_{12}$. The switch 22 is set for its contacts, on falling pressure, to close at 4 p.s.i. With $S_8$ in the Normal position, a reduction in manifold pressure to 4 p.s.i. energizes $K_{12}$ and breaks antenna control circuit 23 preventing antenna rotation.

A second embodiment of the pressure control unit 15 is shown in Fig. 4 and is of a pneumatic type. In this method the reduced pressure available at the top of the radome in the presence of wind is used to actuate a valve controlling the cell pressure. A sphere has certain well known aerodynamic characteristics. The characteristic of interest here is the distribution of pressure resulting from the high air velocities induced over the contour of the sphere. The pressure distribution may be related to the geometry of the sphere by the following equation:

$$\Delta P = (1 - 9/4 \sin^2 \phi) q$$

where $\Delta P$ is the pressure difference from atmospheric pressure,
$\phi$ is the angle at the center of the sphere formed by the wind direction and a radial line to the point at which the pressure is desired,
$q$ is the impact or ram pressure $\frac{1}{2} \rho U^2$,
$\rho$ is the density of air in slugs/cubic foot, and
$U$ is the free stream wind velocity in feet/second.

From this equation it is seen that, for horizontal wind, the maximum pressure difference occurs at the top of the sphere ($\phi=90°$) and equals $-1.25\ q$. To utilize this pressure difference it is only necessary to place an orifice at the top of the sphere.

As seen in Fig. 4, an orifice 30 is provided as part of the radome cap piece 31. This orifice is connected by vacuum line 32 to the space below diaphragm 33 of pneumatic valve 34. The upper surface of the diaphragm is exposed to atmospheric pressure inside the radome. Air under high pressure is admitted from line 16 to the space between pistons 35 and 36. Line 18 connects the valve to the manifold and communicates with the interior of the valve through port 37. Manifold pressure is also applied through passageway 38 and orifice 39 to the space below piston 40.

Diaphragm 33 is weighted by weights 41 which urge piston 35 downward. This downward force is opposed by the manifold pressure acting upward against piston 40. If the manifold pressure is insufficient to support the weights piston 35 moves downward uncovering port 37 and admitting high pressure air to the manifold. When the manifold pressure has risen sufficiently to just balance the force of weights 41 (and the weight of the movable valve member) piston 35 moves upward closing port 37 and preventing a further increase in manifold pressure. Should the manifold pressure fall for any reason, piston 35 would again move downward under the influence of weights 41 and admit high pressure air to the manifold until the pressure again counteracted the weights and closed port 37. Therefore, in the absence of wind, the valve operates to maintain a fixed minimum manifold pressure determined by the size of weights 41. As in the electrical pressure control system described above, the weights may be such as to hold the manifold pressure at 5 p.s.i. Obviously, a spring could be used in place of weights 41.

The pressure on the under side of diaphragm 33 equals that at the top of the radome which is sampled at orifice 30. In the absence of wind, this pressure is atmospheric, as assumed above in describing the manner in which minimum manifold pressure is maintained. In the presence of wind, the pressure at the orifice falls below atmospheric and this reduced pressure communicated to the under side of diaphragm 33 results in an additional downward force equal to the difference between the pressure at orifice 30 and atmospheric pressure. This causes piston 35 to move downward and high pressure air to be admitted to the manifold until its pressure has risen sufficiently to counteract the effect of weights 41 and the added pressure difference force. This moves piston 35 upward closing port 37 and preventing a further manifold pressure rise. Further increases in wind velocity result in greater difference pressures acting on diaphragm 33, as shown by the above equation, which results in correspondingly higher manifold pressures. A decrease in wind velocity causes a reduction in the difference pressure acting on the diaphragm with the result that the manifold pressure acting against piston 40 moves piston 35 upward uncovering port 37 and allowing the manifold air to exhaust through orifice 42. When the manifold pressure has fallen to a value just sufficient to counterbalance the downward force on the diaphragm, piston 35 moves downward closing port 37 and preventing a further reduction of manifold pressure. By a similar process, further decreases in wind velocity cause corresponding reductions in manifold pressure until at zero wind velocity the manifold pressure has been reduced to the minimum value of 5 p.s.i.

In the embodiments of Figs. 3 and 4, the stiffness of the radome is controlled entirely by controlling the pressure within the radome cells. This method has the advantage that the interior of the radome remains at atmospheric pressure but has the disadvantage of increased vulnerability to puncture. In the embodiments of Figs. 5 and 6, now to be described, the cell pressures are held at the minimum value of 5 p.s.i. at all times and the added stiffness required in the presence of wind is produced by increasing the pressure within the radome. This, of course, requires that the joints of the radome envelope, the entrance to the envelope, the line of juncture between the envelope and the platform, and the platform itself be air tight. A system of this type, however, offers certain advantages. One advantage is that the low constant cell pressure diminishes leakage and increases the life expectancy of the fabric. Another advantage is reduced vulnerability to puncture. In case of numerous punctures, the cells which hold a relatively small amount of air at high pressure will quickly deflate since not enough high pressure air could be supplied to overcome the loss. However, a low pressure system equipped to supply a large volume of air will be able to keep the inside of the envelope at desired pressure because the volume of low pressure air escaping will be less than the input of the blower even if the punctures are numerous.

Referring to Fig. 5, a motor, pump and tank assembly 43 provides a reserve of air at high pressure for maintaining the constant 5 p.s.i. pressure in the radome cells. This air is admitted to the manifold 17 through a reducing valve 44 set to maintain the manifold pressure at 5 p.s.i. or other desired minimum value. A safety valve 21 is provided to limit the maximum manifold pressure. The manifold 17 is connected to the radome cells through air lines 19 as in Figs. 1a and 1b. The 5 p.s.i. pressure is sufficient to support the radome at wind velocities up to 60 m.p.h.

In the embodiment of Fig. 5, the pressure inside the radome is increased as the wind velocity increases by ram pressure supplied to the interior of the radome envelope through airscoops. For this purpose there are provided eight large airscoops 45 spaced at 45° intervals and connected to the radome interior through fabric type check valves, one of which is shown. Since the ram pressure increases with wind velocity increasing winds will automatically be accompanied by increased pressure inside the radome. The interior pressure, however, will rarely exceed several inches of water and will never be so high that an air lock will be necessary for entering the envelope. Heating units 46 may be used to de-ice the scoops when required.

The embodiment of Fig. 6 is similar to that in Fig. 5 except that, instead of air scoops, a high volume blower controlled in accordance with wind velocity is used to raise the interior radome pressure. The 5 p.s.i. constant cell pressure is maintained in the same way as in Fig. 5. A high volume blower 47 having input 48 and an output 49 with check valve operates to raise the pressure within the radome in the presence of wind by an amount comparable to the ram pressure in Fig. 5. The blower is driven by motor 50 energized from power line 51 through relay 52 which is under control of pressure control unit 53.

A suitable pressure control unit 53 is shown schematically in Fig. 7. A negative pressure which increases in magnitude with wind velocity is derived over line 54 from an orifice at the top of the radome sphere as in Fig. 4. This negative pressure acts on the under side of diaphragm 55. Outside static atmospheric pressure provided by line 61 acts on the upper sides of diaphragms 55 and 56. Interior radome pressure acts on the under side of diaphragm 56. In the presence of wind, a downward pressure is exerted on diaphragm 55 which moves pin 57 downward grounding contact 58 and energizing relay 59. Contact 58 is mounted on a resilient arm designed to permit the maximum downward movement of pin 57 without breaking contact. Energization of relay 59 closes relay 52 energizing blower motor 50. When the upward force on diaphragm 56, resulting from the increasing interior pressure, counterbalances the downward pressure on diaphragm 55, the diaphragms center and contact 57—58 is broken when the arm of contact 58 comes to rest against fixed insulated stop 60. Breaking this contact deenergizes relays 59 and 52 and stops the blower. Since the upward pressure on diaphragm 56 required to stop the motor increases as the wind velocity and the resulting negative pressure in line 54 increase, the control operates to maintain the interior radome pressure at a value determined by the wind velocity. Since the maximum interior pressure attained in this method is not great, it is not necessary to provide means for reducing this pressure when the wind diminishes. Due to leakage, the interior pressure will in time readjust itself to the lower wind velocity, or, in the absence of wind, to atmospheric pressure.

We claim:

1. In combination with a dual wall radome the envelope of which consists of a plurality of joined airtight cells of dual wall fabric: a source of high pressure air; a manifold; an air line connecting each cell to said manifold, a normally closed solenoid actuated intake valve situated between said source and said manifold; a normally closed solenoid actuated exhaust valve connected to said manifold; a single pole single throw normally closed pressure actuated switch connected to receive manifold pressure and set to open at a predetermined minimum pressure sufficient to impart a minimum rigidity to said envelope; circuit means connected between said pressure switch and the solenoid of said intake valve and operative to energize said solenoid when said pressure switch is closed; an anemometer generator; a plurality of single pole normally open pressure actuated switches connected to receive manifold pressure and set to close at progressively higher pressures above said minimum pressure; a corresponding number of electrically operated switches connected to said generator, said switches being normally in a first position and being actuatable to a second position at progressively higher outputs from said generator; and an electric circuit interconnecting each normally open pressure actuated switch, its corresponding electrically operated switch and the solenoids of said intake and exhaust valves, each of said circuits operating when said electrically operated switch is in its second position and said normally open pressure actuated switch is open to energize the solenoid of said intake valve, and operating when said electrically operated switch is in its first position and said normally open pressure actuated switch is closed to energize the solenoid of said exhaust valve.

2. In combination with a dual wall radome the envelope of which consists of a plurality of joined airtight cells of dual wall fabric: a source of high pressure air; a manifold; an air line connecting each cell to said manifold; means for obtaining a reduced pressure that is less than atmospheric pressure by an amount that is a direct function of wind velocity; pneumatic valve situated between said high pressure air source and said manifold, said valve being actuated by opposing first and second forces, said first force being the sum of a force proportional to the difference between atmospheric pressure and said reduced pressure and a predetermined fixed force, and said second force being proportional to manifold pressure, said valve operating when said first force exceeds said second force to admit air from said high pressure source to said manifold and operating when said second force exceeds said first force to exhaust air from said manifold.

3. Apparatus as claimed in claim 2 in which said radome envelope is spherical in shape and in which said reduced pressure is obtained at an orifice located at the highest point of said spherical envelope.

4. A radome comprising a gas impervious envelope having an airtight attachment to a gas impervious base to form an airtight enclosure, said envelope consisting of a plurality of joined airtight cells of dual wall fabric, means for inflating said cells and for maintaining the pressure therein at a predetermined relatively low value sufficient to impart a desired minimum structural rigidity to said envelope, and means for increasing the pressure within said enclosure above atmospheric pressure by an amount directly related to wind velocity, said means comprising a plurality of air scoops communicating with the interior of said enclosure and equipped with check valves to permit air to enter but to oppose its escape from said envelope, said air scoops having horizontal radial receiving axes equally spaced about a horizontal circle.

5. A radome comprising a gas impervious envelope having an airtight attachment to a gas impervious base to form an airtight enclosure, said envelope consisting of a plurality of joined airtight cells of dual wall fabric, means for inflating said cells and for maintaining the pressure therein at a predetermined relatively low value sufficient to impart a desired minimum structural rigidity to said envelope, and means for increasing the pressure within said enclosure above atmospheric pressure by an amount directly related to the wind velocity, said means comprising a low pressure high volume blower having an inlet outside said enclosure and an outlet with air check valve inside said enclosure, blower driving means, means for producing a reduced pressure that is below atmospheric pressure by an amount directly related to wind velocity, and pressure responsive control means connected to said reduced pressure producing means and subject to both atmospheric pressure and the pressure inside said enclosure so as to be acted on by first and second opposing forces, the first force being proportional to the difference between atmospheric pressure and said reduced pressure and the second force being proportional to the pressure inside the enclosure, said control means acting when said first force exceeds said second force to energize said blower driving means.

6. Apparatus as claimed in claim 5 in which said envelope is in the form of a cut off sphere and in which said meansf or producing a reduced pressure is an orifice located at the highest point of said spherical envelope.

7. In combination with a dual wall radome the envelope of which consists of a plurality of joined airtight cells of dual wall fabric, means for imparting a minimum structural rigidity to said envelope comprising means to inflate said cells and to prevent the pressure therein from falling substantially below a predetermined minimum value, means operative in the presence of wind and responsive to wind velocity for increasing the cell pressure above said minimum value by an amount directly related to the wind velocity, an antenna housed in said envelope, drive means for imparting a scanning motion to said antenna, and means responsive to cell pressure and operative when said cell pressure falls a predetermined amount below said minimum value to disable said drive means.

References Cited in the file of this patent

UNITED STATES PATENTS

| | | |
|---|---|---|
| 1,302,182 | Lanchester | Apr. 29, 1919 |
| 2,355,248 | Stevens | Aug. 8, 1944 |
| 2,418,069 | Delano | Mar. 25, 1947 |
| 2,642,883 | Hasselquist | June 23, 1953 |
| 2,731,055 | Smith | Jan. 17, 1956 |
| 2,819,724 | Barker | Jan. 14, 1958 |